(12) United States Patent
Semenov

(10) Patent No.: US 9,655,346 B2
(45) Date of Patent: May 23, 2017

(54) FORCED AIR PESTICIDE VAPORIZER

(76) Inventor: Andrey Semenov, Sacramento, CA (US)

( * ) Notice: Subject to any disclaimer, the term of this patent is extended or adjusted under 35 U.S.C. 154(b) by 267 days.

(21) Appl. No.: 13/585,130

(22) Filed: Aug. 14, 2012

(65) Prior Publication Data

US 2014/0048620 A1    Feb. 20, 2014

(51) Int. Cl.
*B05B 1/24* (2006.01)
*B05C 1/00* (2006.01)
*A01K 51/00* (2006.01)
*A01M 1/20* (2006.01)
*B05B 7/16* (2006.01)

(52) U.S. Cl.
CPC ........... *A01K 51/00* (2013.01); *A01M 1/2072* (2013.01); *A01M 1/2077* (2013.01); *B05B 7/1686* (2013.01)

(58) Field of Classification Search
CPC  B05B 1/083; B05B 12/06; B05B 1/18; B05B 1/24; B05B 7/0815; F23D 11/04; F23D 11/08; F23D 14/00; F23D 14/78; F02M 53/043; F02M 53/06; A61L 9/03
USPC ......... 239/99, 101, 525, 532, 650, 128, 132, 239/133, 135, 136, 137, 138; 401/1, 2
See application file for complete search history.

(56) References Cited

U.S. PATENT DOCUMENTS

| | | | |
|---|---|---|---|
| 3,940,069 A * | 2/1976 | Gunzel et al. | 239/318 |
| 4,065,057 A * | 12/1977 | Durmann | 239/79 |
| 4,260,873 A | 4/1981 | Simmonds | |
| 4,646,377 A | 3/1987 | Ritter | |
| 4,965,287 A | 10/1990 | Stendel et al. | |
| 5,230,894 A | 7/1993 | Robert et al. | |
| 5,946,851 A * | 9/1999 | Adey et al. | 47/1.5 |
| 6,620,025 B2 | 9/2003 | Scheuneman et al. | |
| 7,578,722 B1 | 8/2009 | Baumgartner | |
| 2011/0078944 A1 | 4/2011 | Stearns | |

* cited by examiner

*Primary Examiner* — Justin Jonaitis
(74) *Attorney, Agent, or Firm* — Costello Law Corporation; John P. Costello

(57) ABSTRACT

Disclosed is a chemical vaporizer device for the purposes of vaporizing and controllably dispensing a pesticide material into a bee hive to kill varroa mites and other predatory pests that threaten honey bees. The device comprises an elongated cylinder having a proximal and distal end, a compressed air inlet, air pressure controller and heating element. The distal end of the device comprises a diffuser outlet and a coiled heating element, which is adapted to rapidly vaporize granular pesticide material in the cylinder while the compressed air discharges the vapor in a constant manner and in higher busts on demand. The user supports the body of the device while controlling the outgoing vapor pesticide by modulating the compressed air controller, which actuates an air valve in the controller. Material is fed into the device proximal end, vaporized and forcibly discharged through the distal end and into a bee hive.

11 Claims, 3 Drawing Sheets

FORCED AIR PESTICIDE VAPORIZER

CROSS REFERENCE TO RELATED APPLICATION

Not Applicable.

BACKGROUND OF THE INVENTION

Field of the Invention

The present invention relates to vaporizing devices and bee keeping tools. More specifically, the present invention pertains to a pressurized vaporizer device for delivering a pesticide to a bee hive for the purposes of killing varroa mites and similar honey bee pests.

Honey bees are a type of bee that are distinguished for their ability to construct large colonies of wax and honey structures, in which the colony produces large quantities of harvestable and consumable honey. An entire industry is dedicated to harvesting the honey from honey bee colonies, where the bees are allowed to build colonies in controlled areas for later extraction of the honey for human consumption. Beekeepers generally utilize a smoke generator for the purposes of stunning or dispersing bees while working in proximity to the bee hive. This allows the beekeeper, while being covered by protective clothing, to approach the hive without causing a large swarm of bees to develop in the process as a reaction to the presence of the beekeeper. Beekeepers are charged with the maintenance and health of the colony, as the honey byproduct of the hive is harvested and sold as a product and source of income. Therefore careful monitoring of the bee colony is required, including the prevention of large scale infestation of pests, disease and even colony collapse disorder (CCD) that can eradicate an entire colony in a short amount of time.

One type of honey bee pest that is particularly dangerous to the overall health of the colony is the vorroa mite, which is a parasitic mite that feeds on the bodily fluids of adult, pupal and larval bees. Associated with the mite itself are associated viruses that the mites transfer to the bees, including Kakugo virus (KV) and cloudy wing virus (CWV), which both can cause collapsing colonies and loss of honey production for the beekeeper. Common methods of treating mite infestation include various chemical treatments that target the mite while minimizing damage to the colony structure and the bees themselves. These include various liquid, solid and vapor injected pesticides that target the mites and are injected directly into the colony.

The present invention relates to a new pesticide dispenser device, wherein a solid pesticide is housed, vaporized and controllably dispensed into a bee colony using compressed air. The device includes an elongated body section having a proximal end for loading granular pesticide material, which flows towards the body distal end where it is heated, vaporized and forced through a nozzle. A beekeeper connects the device to an air compressor, where a continuous stream of air pressure maintains the outward discharge of vapor, while a secondary valve provides bursts of air pressure as desired. The heating of the pesticide is operated by a coiled heating element along the distal end of the device body section, which rapidly heats and vaporizes the material using electrical resistance heating. The pressurized dispensing and increased control over the vapor protects the beekeeper for ingesting poisonous vapor, while also allowing improved control over its dispensation into a bee hive.

Description of the Prior Art

Devices have been disclosed in the prior art that relate to pesticide dispensers and beekeeping devices. These include devices that have been patented and published in patent application publications, and generally relate to smokers and heated vaporizers without a means to forcibly dispense the vapor from the device. The forgoing is a list of devices deemed most relevant to the present disclosure, which are herein described for the purposes of highlighting and differentiating the unique aspects of the present invention, and further highlighting the drawbacks existing in the prior art.

Specifically, U.S. Pat. No. 6,620,025 to Scheuneman discloses an apparatus and method of treating honey bee diseases and killing mites within a hive using a formic acid vapor and a delivery device therefor. The delivery device comprises an evaporation chamber that is heated by an electrical element that is maintained by a mechanical thermostat, where the acid becomes a volatile material that is dispensed through metered apertures from the chamber. The thermostat and metered apertures are utilized as a means to control the output of vaporized material, while the structure of the chamber includes a reservoir and construction that is largely unaffected by corrosive chemicals such as formic acid. The Scheuneman device, while providing a means and method of killing honey bee varroa and tracheal mites, provides a structure that utilizes a heated chamber of acid, as opposed to a pressurized, heated and metered vaporizer that includes a tapered cylinder for dispensing a chemical vaporized pesticide material.

Another such device is U.S. Published Patent Application Publication No. 2011/0078944 to Stearns, which discloses an improved bee smoker for controlling bees for a beekeeper, wherein the device comprises a housing having a power source, heating element, fan and control switches for operation. The device creates smoke on-demand for the user without utilizing a constantly burning source that otherwise has little control over its continued operation. The heating element smolders a fuel source to generate smoke without causing combustion, while a flow mechanism dispenses the generated smoke through an aperture for use controlling bees around a hive. The Stearns device, while designed for controlled use around bee hives, does not disclose an air pressure source for vaporizing a bee pest killer, as described in the present invention. The structure, elements and intent of the present invention differ from that of Stearns.

Further, U.S. Pat. No. 7,578,722 to Baumgartner discloses a device for vaporizing and blowing pesticide into a bee hive, comprising a housing having a discharge end, an internal heater, a fan positioned within the rear of the housing and a pesticide receptacle that is placed into the upper portion of the housing. A dosimeter cavity fills with pesticide beneath the receptacle, which is controlled by a slide that dispenses pesticide onto the heating element for vaporization. The fan then blows the vaporized pesticide through the discharge end of the housing. While providing a vaporizing device, the Baumgartner device does not include a forced air inlet for forcibly dispensing vapor from its structure, as disclosed in the present invention, while the present invention further includes controls over the heating elements for vaporization and dispensing control.

Finally, U.S. Pat. No. 4,260,873 to Simmonds discloses a similar device as the Baumgartner device, wherein a hand-held vapor polishing device is described having a vaporizing chamber, a container for storing plastic solvent and a thermostatically controlled electric heating element for heating the solvent. A downwardly facing guide tube dispenses vaporized solvent onto plastic surfaces for polishing purposes. The container is inverted and connected to the body of the device, which further contains the heating element heat the downwardly flowing solvent before sending the vapor through the guide tube outlet. The Simmonds device is one that utilizes a heating element and a gravity fed process of transferring liquid solvent into the vapor. The present invention provides a pressurized heating device for vaporizing a bee pest chemical.

The present invention provides a means to both vaporize and forcibly dispense a pesticide material into a beehive colony, allowing the vapor to be injected into the colony and away from the beekeeper user. Pressure is derived from an attached air compressor that maintains a constant flow of air from the device, while a secondary valve allows for increased burst pressure as desired by the user. It is submitted that the structure and function of the present invention is substantially divergent in elements from the prior art, and consequently it is clear that there is a need in the art for an improvement to existing vapor pesticide dispensing devices. In this regard the instant invention substantially fulfills these needs.

SUMMARY OF THE INVENTION

In view of the foregoing disadvantages inherent in the known types of vapor pesticide dispensing devices now present in the prior art, the present invention provides a new pressurized vaporizer device that can be utilized for providing convenience for the user when forcibly dispensing pesticide vapor into a honey bee colony for the purposes of eliminating mites and other bee pests.

It is therefore an object of the present invention to provide a new and improved vapor pesticide dispensing device that has all of the advantages of the prior art and none of the disadvantages.

It is another object of the present invention to provide a vapor pesticide dispensing device that includes a heated and pressurized means dispensing a vapor material for use in eliminating pests in a bee hive colony.

Another object of the present invention is to provide a vapor pesticide dispensing device that includes an electrical resistance heating element at the distal end of the device for rapidly vaporizing a granular or solid material into an airborne vapor.

Yet another object of the present invention is to provide a vapor pesticide dispensing device having a compressed air input and means for controlling the flow of pressurized air through the device as vapor is forcibly dispensed into a honey bee colony and away from the user.

Other objects, features and advantages of the present invention will become apparent from the following detailed description taken in conjunction with the accompanying drawings.

BRIEF DESCRIPTIONS OF THE DRAWINGS

Although the characteristic features of this invention will be particularly pointed out in the claims, the invention itself and manner in which it may be made and used may be better understood after a review of the following description, taken in connection with the accompanying drawings wherein like numeral annotations are provided throughout.

DETAILED DESCRIPTION OF THE INVENTION

Figure 1:
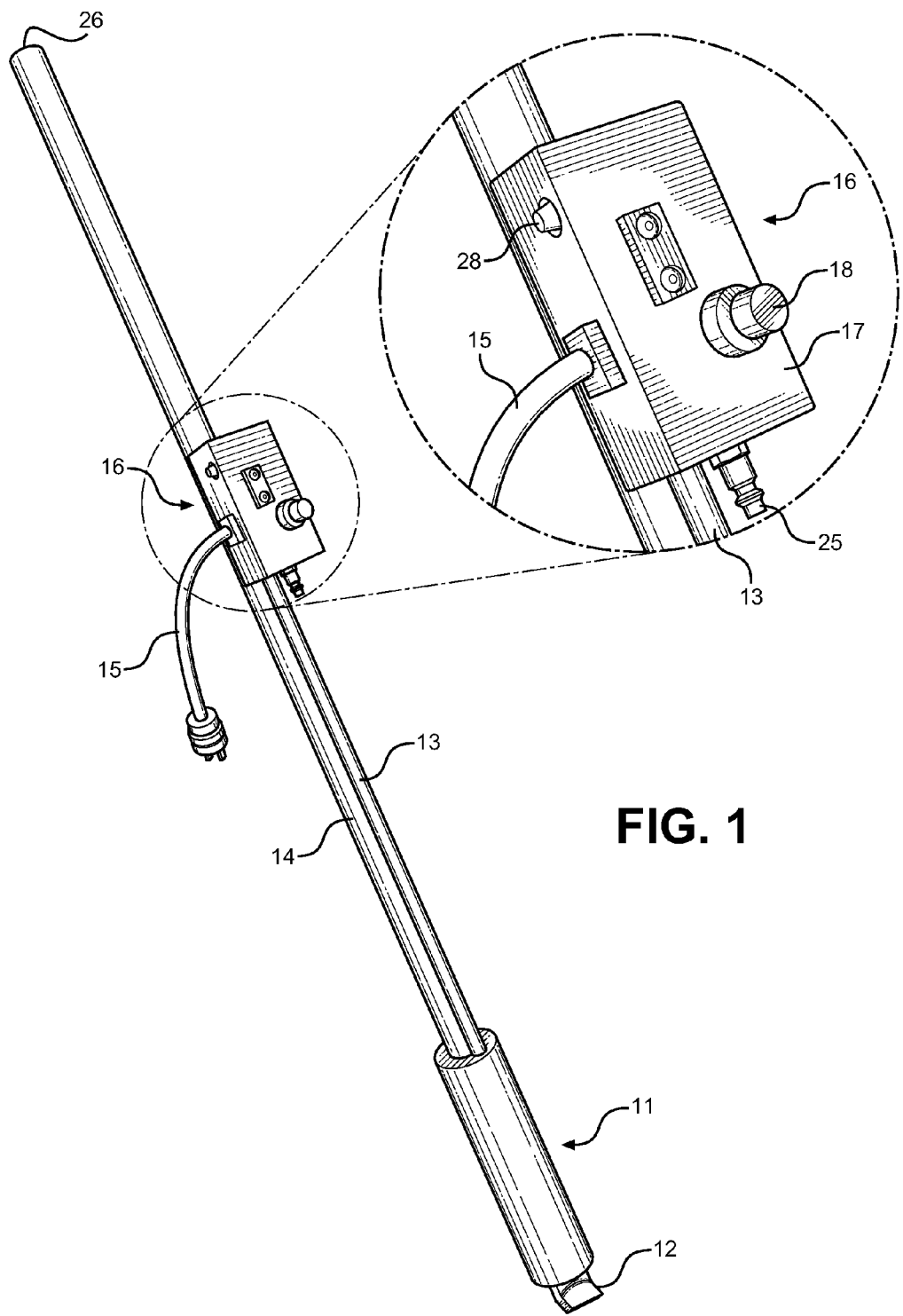
FIG. 1 shows a perspective view of the present invention, along with a close-up view of the air pressure controller box.

Reference is made herein to the attached drawings. Like reference numerals are used throughout the drawings to depict like or similar elements of the vapor pesticide dispensing device. For the purposes of presenting a brief and clear description of the present invention, the preferred embodiment will be discussed as used for forcibly dispensing a vapor pesticide into a honey bee colony for eliminating honey bee pests and projecting the poisonous vapor away from the user. The figures are intended for representative purposes only and should not be considered to be limiting in any respect.

Referring now to FIG. 1, there is shown a perspective view of the pressurized pesticide vaporizer of the present invention. The device comprises an elongated and tubular body structure 14 having a proximal end 26, distal end 12 and centrally located operational control interface 16. The device is adapted to accept granular or otherwise solid pesticide material into its open proximal end 26 for vaporization of the material and forceful discharge through its distal working end 12. The material is collected along the distal end and is rapidly heated using a high temperature electrical resistance heating element 11, which melts and vaporizes the material into an airborne vapor that is adapted to be dispensed into a honey bee colony for eradicating mites and other honey bee pests. To facilitate the vaporization process and to maintain steady flow of the vapor from the distal end 12, a compressed air connect 25 and controller 16 is provided for actively pressurizing the system and forcing the vapor through a nozzle or diffuser element. The constant pressurization from the compressed air forces the vapor from the device and into a bee colony, while also keeping the vapor from collecting near the user and causing a risk of contact with poisonous pesticide vapors.

Mounted along the body 14 of the device is a control box housing 17 that offers the user the ability to modulate the outgoing pressure 18, request momentary bursts of high pressure 28 and further provide a means to connect an air compressor hose 25 and electrical power source 15. The control box 16 is the user's control over the device's operation and the connection point for incoming electrical and pneumatic connections. A compressor hose connector 25 is provided, which allows air from an air compressor to be inserted into the system, passed through an air filter 24, and diverted and sent down the length of the body structure 14 towards the working end 12. Further provided is an electrical cord attachment 15, which connects to an extension cord member for providing power to the heating element 11 that vaporizes the pesticide material. The electrical connections exit the box 16 through an enclosed conduit 13 adjacent and parallel to the body 14, and enter the heating element housing 11. Finally, a constant pressure control knob 18 controls the continuous air pressure entering the body 14 while a burst pressure button [18] 28 is provided for instantaneous release of higher pressure air from the compressor source. The first of these is meant to control a lower outgoing pressure that maintains the vaporizing function of the heating element and prevents vapor from rising towards the user, while the burst pressure is utilized for momentary burst of higher pressure when inserting vapor into the bee colony. The burst ensures thorough insertion and enveloping of the colony with the vapor during operation.

Figure 2:
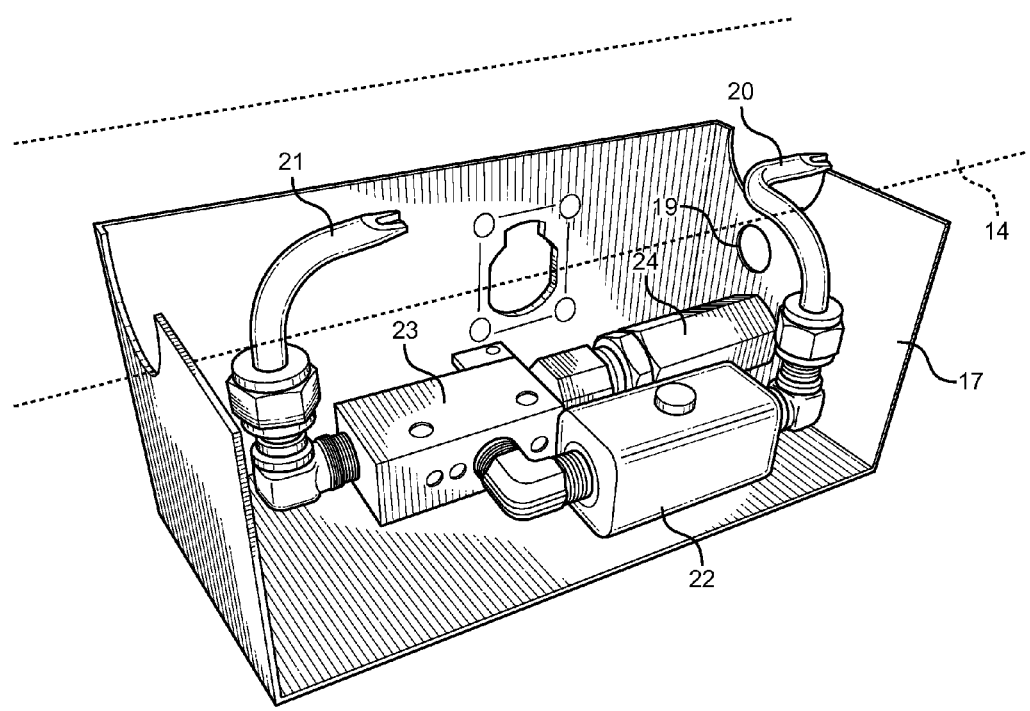
FIG. 2 shows an internal view of the air pressure controller box.

Referring now to FIG. 2, there is shown an internal view of the control box of the present invention, illustrating the constant pressure nozzle 21, the burst pressure nozzle 20 and their connections within the box housing 17. The control box is provided as a housing for modulating the outgoing pressure of the vapor during deployment, and comprises an inlet conduit 25, a first pressure valve 23 controlled by a turn dial, and a second release valve 22 that diverts air from the first valve 23 directly into the body device 14. The first pressure valve 23 includes a first nozzle 21 while the second valve 22 connects to a second nozzle 20, both entering the tubular body and angling towards the body distal end. The electrical connections between the electrical cord and the electrical connection to the heating element is removed for the purpose of clarity; however adequate space and housing apertures 19 are provided for the cord and the outgoing electrical connections.

Figure 3:
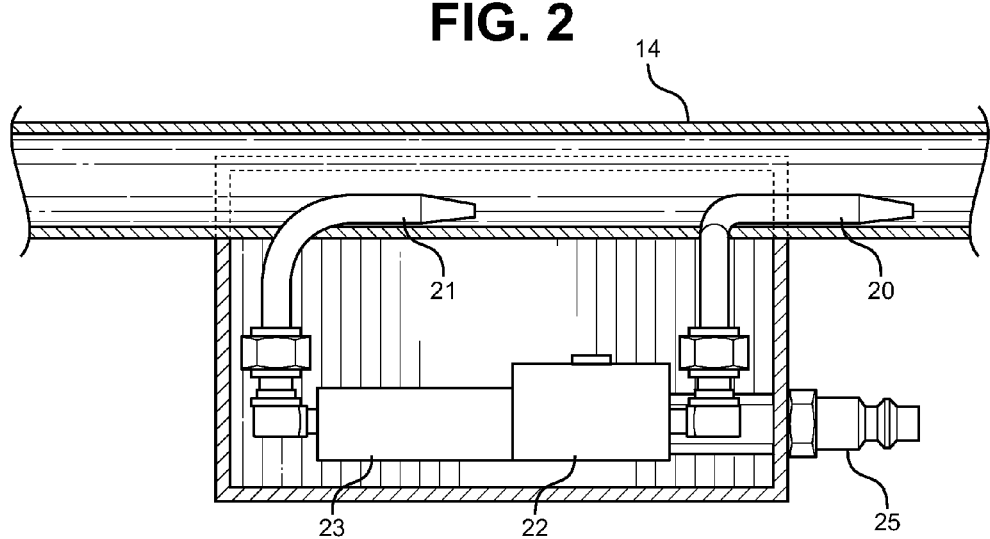
FIG. 3 shows a cross sectional side view of the air pressure controller box.

Referring now to FIG. 3, there is shown a cross sectional view of the control box connections and the tubular body structure of the present invention. An air compressor connector 25 provides a means to connect an air hose from an air compressor to the system, whereby pressurized air enters the conduits within the control box. The first valve 23 sets the constant pressure exiting the device working end by opening a valve to a set opening to restrict the air flow exiting its connected nozzle 21. The operator can request this constant pressure be increased or decreased, depending on requirements during operation and the pressure exerted from the compressor. The second valve 22 is one that instantly diverts all air from the first valve 23 and allows the full extent of the pressurized air to enter the device body 14 through a second nozzle 20. This allows for a metered and constant flow of air pressure to be accompanied by an ability to release a burst of high pressure vapor on-demand.

Figure 4:
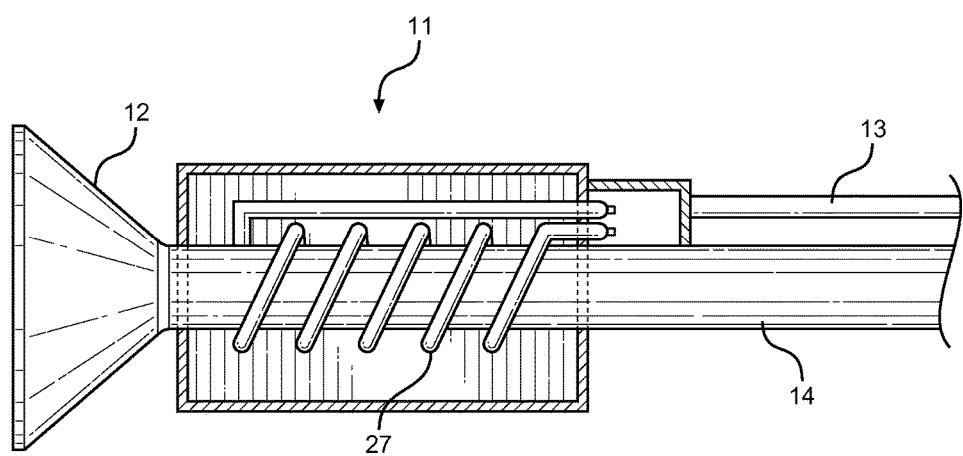
FIG. 4 shows a cross sectional side view of the electrically heated distal end of the device.

Referring now to FIG. 4, there is shown a cross section view of the distal end of the pressurized vaporizer, wherein the heating element housing 11 is shown. The housing includes an electrical resistance heating element 27 that preferably coils around the body section 14 for rapidly heating and vaporizing granular and solid material flowing therein. Electrical power is received from a connection to the control box through an enclosed conduit 13, which allows current flow through the resistance heating element 27. In operation, material is placed within the hollow interior of the body section 14 and the distal end 12 is angled downward, allowing the material to flow to the distal end. An optional screen is provided to capture solid material prior to vaporization, while the pressurized air flows through the body section 14 and through a nozzle or diffuser element 12 at the end of the body 14. During deployment, the element 12 is placed into a bee colony, while the vaporized material is forcibly entered thereinto for eradicating honey bee pests.

Varroa mites prey on honeybee offspring, debilitating the proliferation of the honeybee population. Varroa, however, rapidly reproduce and infect the bees to the point of threatening the entire colony. These mites are very difficult to eliminate and persist even in adverse conditions. This poses a danger to the honeybee population, and may result in a decline in population and therefore honey production. Standard pesticide vaporizing products designed to kill varroa may take several minutes to being functioning, and may require users to be in dangerously close proximity to the volatile vapors. The present invention is therefore submitted as a means to forcibly insert the vapor into a bee colony while remaining away from vapor updraft. The body structure may include an internal taper or nozzle working end, through which pressurized vapor is expelled through the working end. The pesticide material is entered into the device through the proximal end, pressurized, vaporized and finally discharged through the distal end of the device. During operation, a constant flow of vapor and momentary pulses of higher pressure vapor are expelled into a bee colony for the purposes of eliminating varroa mites that prey on the offspring of honeybees. The operation and structure of the present invention are both unique and readily useful to one skilled in the art of beekeeping and pest control.

It is therefore submitted that the instant invention has been shown and described in what is considered to be the most practical and preferred embodiments. It is recognized, however, that departures may be made within the scope of the invention and that obvious modifications will occur to a person skilled in the art. With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A pressurized vapor dispensing device, comprising:
   an elongated and hollow body structure having a proximal end, distal end and a central control interface;
   a compressed air connection for accepting pressurized air into said hollow body structure and directing said vapor through said distal end;
   said control interface further comprising:
   a first pressure valve connecting to a first air pressure nozzle within said hollow body structure being directed toward said body distal end;
   a second pressure valve connecting to a second air pressure nozzle within said hollow body structure being directed toward said body distal end;
   said second pressure valve diverting incoming pressurized around said first valve and through said second nozzle;
   said body proximal end adapted to accept material there through to travel through said hollow body;
   said distal end comprising an electrical heating element for heating said material into a vapor.

2. The device as recited in claim 1, wherein said first pressure valve is controlled by a rotatable control knob to set a constant outgoing pressure for said vapor to be expelled through said body distal end.

3. The device as recited in claim 1, wherein said first pressure valve is controlled by a push button to create a burst of high pressure vapor through said body distal end.

4. The device of claim 1, wherein said control interface further comprises an electrical connector for accepting power for said electrical heating element, said electrical power being routed through a conduit to said heating element.

5. The device of claim 1, wherein said distal end further comprises a nozzle.

6. The device of claim 1, wherein said distal end further comprises a diffuser.

7. A pressurized vapor dispensing device, comprising:
an elongated and hollow body structure having a proximal end, distal end and a central control interface;
said body proximal end adapted to accept material there through to travel through said hollow body;
said distal end comprising an electrical heating element for heating said material into a vapor;
a compressed air connection for accepting pressurized air into said hollow body structure and directing said vapor through said distal end; and
a pressure valve, said pressure valve having means for actuating said pressure valve to create a burst of high pressure vapor through said body distal end.

8. The device as recited in claim 7, wherein said means for actuating said pressure valve to create a burst of high pressure through said body distal end comprises a button attached to said control interface.

9. The device of claim 7, wherein said control interface further comprises an electrical connector for accepting power for said electrical heating element, said electrical power being routed through a conduit to said heating element.

10. The device of claim 7, wherein said distal end further comprises a nozzle.

11. The device of claim 7, wherein said distal end further comprises a diffuser.

* * * * *